Figure 4:
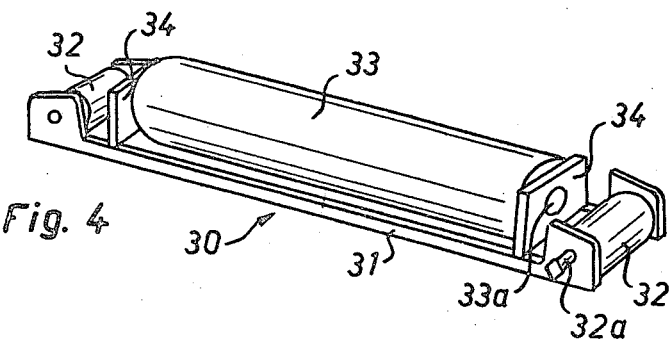

United States Patent
Val

[11] Patent Number: 4,465,313
[45] Date of Patent: Aug. 14, 1984

[54] INSTALLATION FOR STORING AND TRANSPORTING ELONGATED OBJECTS

[76] Inventor: George Val, Alte Buchserstr. 14, Dällikon, Switzerland

[21] Appl. No.: 325,423
[22] PCT Filed: Apr. 1, 1981
[86] PCT No.: PCT/CH81/00038
 § 371 Date: Nov. 20, 1981
 § 102(e) Date: Nov. 20, 1981
[87] PCT Pub. No.: WO81/02877
 PCT Pub. Date: Oct. 15, 1981

[30] Foreign Application Priority Data
 Apr. 1, 1980 [CH] Switzerland .......... 2569/80

[51] Int. Cl.³ .......................... B66C 1/16
[52] U.S. Cl. .......................... 294/67 DA; 206/443; 206/509; 211/49 R; 294/67 R; 414/608
[58] Field of Search .......... 294/67 R, 67 B, 67 BC, 294/67 D, 67 DA, 67 DB, 81 R, 81 SF; 206/503, 509, 511, 512, 821, 443; 280/33.99 T, 79.1 A; 414/97, 608; 108/53.1; 211/49 R, 60 R, 60 S, 188, 194

[56] References Cited
U.S. PATENT DOCUMENTS

| | | | |
|---|---|---|---|
| 1,029,139 | 6/1912 | Moltrup | 294/67 D X |
| 3,028,186 | 4/1962 | Skubic | 294/67 D |
| 3,157,424 | 11/1964 | Hall | 294/67 D |
| 3,303,944 | 2/1967 | Parsons | 294/67 D X |
| 3,438,160 | 4/1969 | Gostling | 294/67 R X |
| 3,533,640 | 10/1970 | Fator | 280/79.1 A X |
| 3,574,382 | 4/1971 | Strauss | 294/67 R |
| 3,720,329 | 3/1973 | Gamble | 414/608 X |
| 3,830,380 | 8/1974 | Spencer | 294/67 D X |
| 4,045,071 | 8/1977 | Dunstan | 294/67 R |

*Primary Examiner*—Johnny D. Cherry
*Attorney, Agent, or Firm*—Murray Schaffer

[57] ABSTRACT

A plurality of elongated frames are arranged one on top of the other. Each frame is formed of a pair of walls having a lower flange and an upper flange between which a plurality of cross bars are arranged which are used for receiving the elongated objects. A roller support is provided to move the frames along the ground. The supports are provided with a carrier roller, the upper face of which is arranged higher than the upper edge of the cross bar to facilitate the unloading of heavy objects. Containers may be inserted between the cross bars for storing short objects. A lifting device and a crane are used to remove or place frames on the stack. The device has two U-sections which grip the upper flanges of the frame, so that the lifting device may be moved around those flanges relative to the center of gravity of the frame to prevent the inclination of the latter.

11 Claims, 9 Drawing Figures

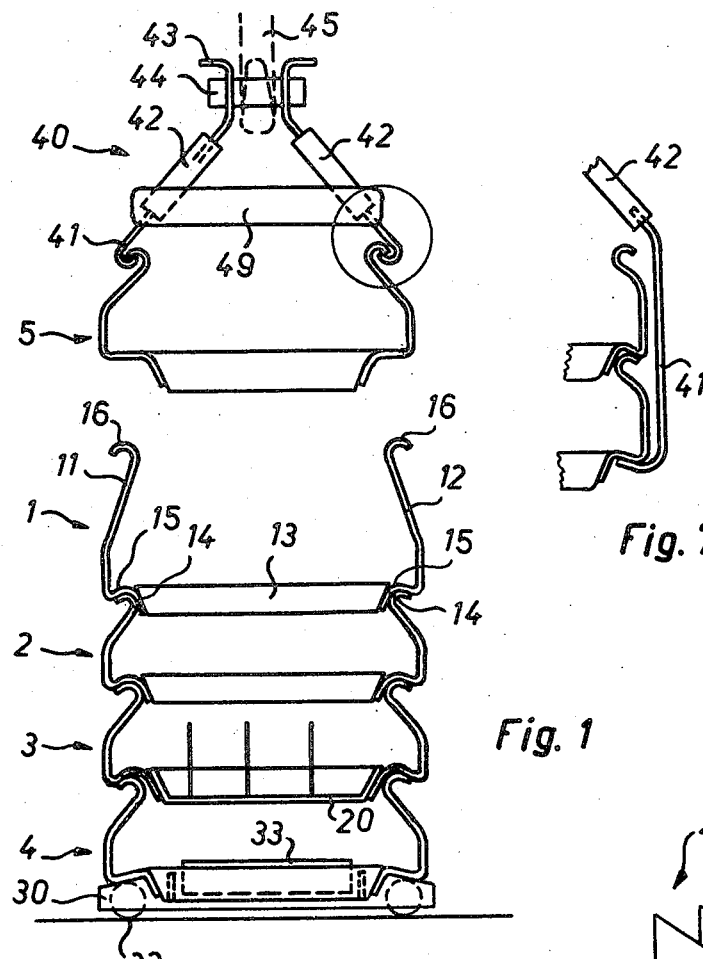
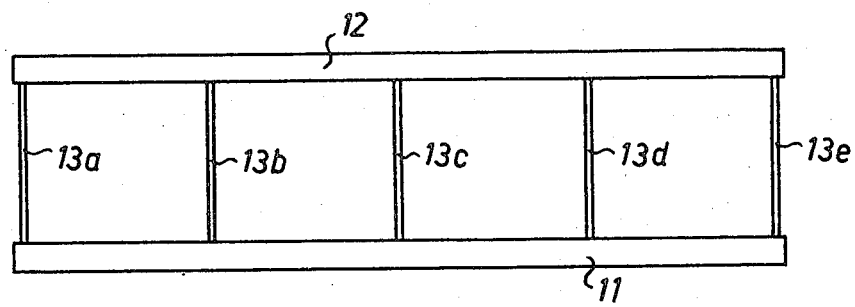

INSTALLATION FOR STORING AND TRANSPORTING ELONGATED OBJECTS

The invention relates to an installation for storing and transporting elongated objects, particularly rods and pipes.

The storage of such elongated objects causes certain problems in connection with the arrangement thereof in the storage places and particularly in connection with their removal therefrom, especially if the rods or pipes have different lengths, diameters and possibly even material qualities. There is also the problem of transporting them from the storage place to the further processing location. Admittedly the conventional fixed storage place permits extensive subdivision, but with the exception of the top compartment they only permit loading and unloading from one end face. This means that the pipes or rods generally delivered in groups or bundles have to be virtually individually inserted into the associated storage chassis, which is time-consuming. Removal can also only take place in the same way. As a result a space must be left following onto the end face of such chassis whose length must at least correspond to that of the elongated objects to be stacked. In turn this leads to space problems. In the case of such chassis it is also virtually impossible to avoid the final objects placed therein, i.e. those at the top being the first to be removed for further use, whereas the objects below them are often left stored for a long time, which is also disadvantageous from the sales standpoint.

The object of the invention is to obviate these disadvantages and provide an installation for the storage of elongated objects which, if required, permits loading and unloading from above or from the end face and which can also be easily moved in both the loaded and unloaded states. This is intended to facilitate changes and modifications within the organisation. If needed the installation should also facilitate transportation between the storage place and the processing point.

According to the invention such an installation is characterized by the features of claim 1.

During transportation it may be necessary to lift the elongated objects by means of a lifting device, usually a crane. However, it is a well-known fact that in a bundle of elongated objects containing both longer and shorter objects, it is difficult to establish the centre of gravity point at which the bundle is to be raised. There is also the danger that on raising the whole bundle may be brought into an undesired or even dangerous inclined position. All that can be done to avoid this is to move the lifting device backwards and forwards several times until the centre of gravity is found and the attached bundle remains relatively horizontal. However, it is very time-consuming to determine the correct suspension point.

A preferred embodiment of the invention which obviates these disadvantages is characterized by the features of claim 6.

An exemplified embodiment of the invention is represented in the drawings, wherein show:

FIG. 1 a stack of individual frames viewed from the front, a roller support and a lifting device.

FIG. 2 a plan view of a single frame.

FIG. 3 a perspective view of an insertion container.

FIG. 4 a roller support, also in perspective view.

Figure 4A:
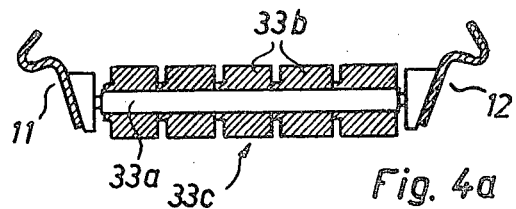

FIG. 4a a roller insert for a frame.

Figure 4B:
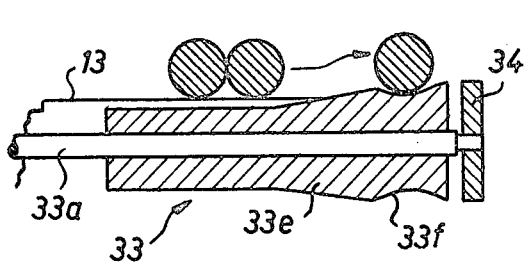

FIG. 4b a variant of both FIG. 4 and FIG. 4a.

Figure 5:
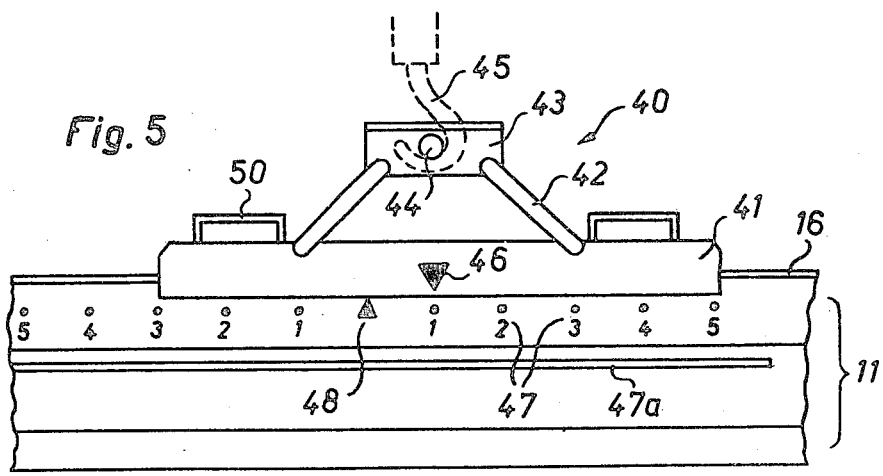

FIG. 5 a lifting device and part of a frame in side view.

Figure 6:
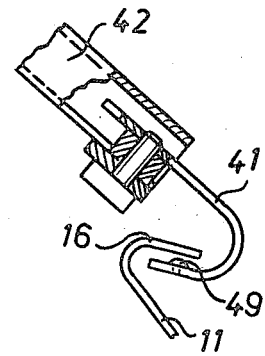

FIG. 6 details of the cooperation between lifting device and frame.

FIG. 7 a modified embodiment of the lifting device.

In FIG. 1 several frames 1 to 4 are stacked on top of one another, whilst a further frame 5 is shown raised from the stack. As shown there can be certain differences in the frames, particularly in their height. The essential point is that they are stackable and consequently all have the same width. According to FIGS. 1 and 2 each frame comprises two longitudinal beams 11, 12 and a plurality of cross-bars 13 or 13$a$-$e$ which interconnect the beams. The number of cross-bars in a function of the frame length. On considering the left-hand beam in FIG. 1, each beam 11, 12 approximately has the shape of the letter Z or the FIG. 2 with and extension 14 which projects downwards from the lower end of said letter of FIGURE. To permit in particular the sliding in of long, thin pipes or rods having a considerable sag without striking against the cross-bars, it must be ensured that the lower flange 15 carrying extension 14 is slightly downwardly inclined and consequently to permit stacking, the upper flange 16 must also be slightly inclined. The extensions 14 then serve to fix cross-bars 13 and the latter in turn are used not only for the construction of the frame but also as supports for storing the elongated objects. However, reference will be made to exceptions. The slope of the flanges also centres stack 1-4.

It is already obvious that the frame can be manufactured with maximum simplicity. The longitudinal beams 11, 12 can be made from suitably chamfered sheet metal. It is also very easy to produce the cross-bars 13, so that such a frame is very inexpensive.

The exterior of the two outer cross-bars is provided with a suitable covering on which it is possible to write information about the stored elongated objects.

As is apparent from frame 3 of FIG. 1, because it has no bases or bottoms it is possible to use insertion containers 20 for the stored objects and they are made shorter than the distance between two adjacent cross-bars. As a result the otherwise open space between cross-bars 13 can be utilized, so that the number of possible uses for the installation is increased. These containers 20 can have a single length corresponding to the spacing between two cross-bars and then also form the frontal terminations, so that the containers do not have their own end wall (FIG. 3). However, by corresponding shaping and by making corresponding notches in such a container, the latter can in fact extend over several cross-bars 13 or even over the entire length of the frame. If desired, partitions 21 (FIG. 3) may also be provided in said containers, the height of the partitions only being limited by the need for the frames to be stackable.

As can be gathered from FIG. 1 the bottom frame 4 rests on at least two roller supports 30 (only one being visible) used for moving the complete stack, cf FIG. 4. A frame chassis 31 which, in the manner of a railroad well waggon is so cut out that it can receive between it the extensions 14 of a frame 1-5 and carries at each of its two ends a roller 32 enabling the roller suppport to be moved. At right angles to said rollers can extend e.g. a single carrier roller 33, which is mounted on an axle 33$a$. However, it is much more advantageous to replace the single carrier roller 33 by several such rollers 33$b$ according to FIG. 4$a$ having a roller insert 33$c$, which has yet to be described. Thus, on inserting or removing individual rods movement of the remaining stored elongated objects is avoided. As can be gathered from FIG. 1, the diameters of rollers 33b and the height of axle 33a are so selected that the top of the rollers projects just above the upper edge of the cross-bars 13, so that the elongated objects mainly rest on these rollers if sufficient roller supports 30 are provided. The cross-bars 13 then only take up the forces acting laterally on the frame, specifically if the frames are stacked.

However, this advantage of easy insertion and easy removal must not be limited to the bottom frame of a stack (frame 5 in FIG. 1). The roller support of FIG. 4 can be modified according to FIG. 4a in such a way that the two rollers 32 are omitted and the frame chassis 31 is so modified that it can be inserted between the two beams 11, 12 at their extensions 14 in the manner of a cross-bar 13. Generally such an insert 33c remains in the particular frame, although only loosely inserted and easily removable, so that it can be used on another frame.

If a single round bar or pipe is to be removed from the stack at a particular point of the frame advantageously a stepped roller according to FIG. 4b is used. It has a conical portion 33e, whose highest point is higher than the upper edge of cross-bars 13, as well as a cable pulley-like portion 33f connected thereto. An individual rod can easily be rolled from the cross-bars on conical portion 33e and from there with little effort into portion 33f. The rod can then be removed without there being any movement of the remaining elongated objects. This is particularly advantageous when it is taken over by an automatic machine, e.g. a cutting machine.

One of the rollers 32 (FIG. 4) can be provided with a connecting piece 32a for a drive. Furthermore rollers 32 can in each case be replaced by a pair of rollers, whose bearing is rotatable about a vertical in the manner of an aircraft nose gear. This increases the maneuverability of the rolling support 30 and therefore the complete stack of frames.

The complete stack of frames 1-4 can be moved with the roller supports 30. A loaded stack can easily be moved by means of a frontal drive. Thus, little time is needed for making changes and modifications within the storage building. However, the stack with the roller supports can also be used as a transporting means and can be transported therewith directly to a processing station, e.g. a saw, which saws the long objects to the desired length. The advance of these objects to the saw presents no problem as a result of the carrier rollers 33.

However, the aforementioned advantages can only be attained if the individual frames can easily be stacked on one another and can equally easily be removed from the stack. For this purpose a lifting device 40 is provided. It must in particular take account of the fact that in the case of very long rods or pipes, each frame must be raised precisely at its centre of gravity, because it would otherwise tilt. However, in the case of a loaded frame this centre of gravity position is not always precisely in the centre, because objects of unequal length may be located thereon. Therefore the lifting device should be easily displaceable, which is achieved through it having two elongated members 41 with an approximately U-shaped cross-section and which engage round the upper flanges 16 (FIG. 1). The two U-shaped members 41 are screwed to sloping supports 42 (FIG. 6) connected rigidly in pairs to a short support 43. The two supports 43 receive between them the supporting member 44 on which can engage a crane hook 45.

As can be seen on each of the members 41 there is a mark in the form of a downwardly pointing arrow 46. In the same way each frame 1-5 has in its centre a scale 47, which extends to both sides from a further arrow 48. The area of scale 47 or a strip 47a positioned below it is designed in such a way that it is possible to write on it, preferably with chalk. In this way the aforementioned centre of gravity of the frame or the engagement point of the lifting device 40 can be marked on or close to the scale, which is advantageous when stacking changes involving briefly moving aside the frame and then placing it back on the stack.

The two members 41 are appropriately provided with a slide preventing means 49 (FIG. 6). It can be in the form of individual projections, perforations or a rough covering preventing the raised frame from sliding out of the lifting device.

The two U-shaped parts 50 (FIG. 5) on either side of the sloping bracket 42 are not primarily intended to serve as handles for moving the lifting device, although they could be used for this purpose. Their main function is to provide engagement points for the forks of a fork lift truck. In this way lifting device 40 can be easily moved and transported.

According to FIG. 1 the frames can only be raised individually. However, in the case of less heavy elongated objects a suitable connection can be provided permitting the raising of several frames. To this end a member 41a longer then U-shaped member 41 is in each case provided on the lifting device (FIG. 7).

I claim:

1. Apparatus for storing and transporting elongated workpieces such as rods and pipes comprising a plurality of frames stackable one on the other, each frame comprising a pair of parallel spaced elongated side walls and a plurality of longitudinally spaced cross bars interconnecting said walls along the length thereof, said side walls being substantially mirror images of each other having in cross section a curved profile provided with an upper and a lower flange aligned along a vertical plane, the upper flange extending outwardly from said vertical plane in a direction inclined downwardly from the horizontal, the lower flange having an extension directed inwardly and downwardly from the horizontal, said wall having a mid section between said upper and lower flanges bowing outwardly from the vertical plane of said flanges, said upper and lower flanges having conforming cross sectional shape whereby upon stacking one frame on another, the upper flanges of a lower frame cooperate with the lower flanges of an upper frame to center and support the upper frame.

2. The apparatus according to claim 1, wherein said side walls are formed by a continuous panel.

3. The apparatus according to claim 1, including at least two movable supports for carrying a stack of frames along the ground or floor, each of said movable supports comprising an elongated chassis having a length substantially equal to the width of said frame, and means cooperating to allow the lower flanges of said frame to removably seat thereon when said chassis is placed between a pair of said cross bars, a first roller journaled at each end along an axis perpendicular to the longitudinal axis of said chassis for movably supporting said chassis on the ground, and a second roller extending along an axis of rotation parallel to the axis of said body chassis such that said second roller extends above said chassis so that its top is higher than the top of said cross bars and is not lower than said ground first rollers.

4. The apparatus according to claim 1, including means for lifting and moving a frame, comprising a pair of tong arms, each arm having an elongated U-shaped member at its lower end and adapted to enter beneath a respective one of said upper flanges, said U-shaped member being slidable longitudinally with respect to said frame and displaceable vertically into engagement with said frame to lift said frame substantially at its center of gravity.

5. The apparatus according to claim 4, wherein said tong arms are articulatingly connected to a hoist.

6. The apparatus according to claim 5, including means on each of said U-shaped members and said side walls of said frame cooperating to indicate the relative positions of the center of gravity of said frames when loaded with workpieces.

7. The apparatus according to claim 5, wherein each of said tong arms extend outwardly and downwardly to provide space for the entry of a frame therein and said U-shaped members are adapted to enter below and engage beneath the lower flanges of said frame.

8. The apparatus according to claim 1, including at least one container mounted between a pair of cross bars and having a bottom set below said cross bars for receipt of workpieces of a length shorter than the distance between said pair of cross bars.

9. The apparatus according to claim 1, including means for supporting workpieces in said frame, said means comprising an elongated roller mounted about an axle journaled at each end fixedly to the inward extensions of the lower flanges of the spaced side walls and extending parallel to said cross bars, at least one end of said roller having a diameter sufficiently large so that its circumferential surface is higher than the cross bars permitting the workpiece to roll thereover perpendicularly to said axle.

10. The apparatus according to claim 9, wherein said at least one enlarged end is conically tapered to permit the workpiece to roll thereover in a direction parallel to said axle.

11. The apparatus according to claim 10, wherein said at least one enlarged end is provided with an annular recess for receipt of a singular workpiece.

* * * * *